US008936512B2

(12) United States Patent
Itahana et al.

(10) Patent No.: US 8,936,512 B2
(45) Date of Patent: Jan. 20, 2015

(54) VIDEO GAME PROCESSING APPARATUS AND VIDEO GAME PROCESSING PROGRAM

(75) Inventors: Toshiyuki Itahana, Tokyo (JP); Motomu Toriyama, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 243 days.

(21) Appl. No.: 13/422,317

(22) Filed: Mar. 16, 2012

(65) Prior Publication Data
US 2012/0238359 A1 Sep. 20, 2012

(30) Foreign Application Priority Data
Mar. 18, 2011 (JP) ................................ P2011-060324

(51) Int. Cl.
*A63F 9/24* (2006.01)
*A63F 13/00* (2014.01)
*A63F 13/40* (2014.01)
*G06F 3/0488* (2013.01)
*G06F 3/0481* (2013.01)
(Continued)

(52) U.S. Cl.
CPC ............. *A63F 13/10* (2013.01); *G06F 3/0488* (2013.01); *G06F 3/04815* (2013.01); *G06T 15/20* (2013.01); *G06T 19/00* (2013.01); *A63F 2300/6676* (2013.01); *A63F 2300/1075* (2013.01); *A63F 2300/6653* (2013.01)
USPC ............ 463/33; 463/2; 463/8; 463/9; 463/30; 463/31

(58) Field of Classification Search
CPC .................. A63F 2300/661; A63F 2300/6669; A63F 2300/6676; A63F 2300/6684
USPC .................................................. 463/8, 31, 33
See application file for complete search history.

(56) References Cited

U.S. PATENT DOCUMENTS 5,706,417 A * 1/1998 Adelson ........................ 345/640
5,850,352 A * 12/1998 Moezzi et al. ................ 345/419
(Continued)

FOREIGN PATENT DOCUMENTS

JP 2007-209482 8/2007

OTHER PUBLICATIONS

Media Works Inc., "New fact, you can make a new discovery by changing your viewpoint!", Dengeki PlayStation, vol. 4, No. 19, Aug. 28, 1998, pp. 10-13, along with partial English translation thereof.
(Continued)

*Primary Examiner* — Steven J Hylinski
(74) *Attorney, Agent, or Firm* — Greenblum & Bernstein, P.L.C.

(57) ABSTRACT

A video game processing apparatus for controlling progress of a video game is provided. Game image information containing positional information of the target object in a game image used in the video game is stored in a game image information memory. A position of a viewpoint against the game image is specified on the basis of progress of the video game. A game image is displayed on the display screen on the basis of the specified position of the viewpoint and the game image information stored in the game image information memory. It is determined whether the target object becomes a non-display state or not in response to a movement request of the viewpoint received from a player. Selection of the target object by the player is received in a case where it is determined that the target object does not become the non-display state.

11 Claims, 10 Drawing Sheets

(51) Int. Cl.
　　*G06T 15/20*　　(2011.01)
　　*G06T 19/00*　　(2011.01)

(56) References Cited

U.S. PATENT DOCUMENTS

| | | | |
|---|---|---|---|
| 5,940,538 A * | 8/1999 | Spiegel et al. | 382/236 |
| 5,949,432 A * | 9/1999 | Gough et al. | 345/629 |
| 6,165,073 A * | 12/2000 | Miyamoto et al. | 463/32 |
| 6,275,236 B1 * | 8/2001 | Delahunty | 345/30 |
| 6,295,064 B1 * | 9/2001 | Yamaguchi | 345/419 |
| 6,320,582 B1 * | 11/2001 | Yamamoto et al. | 345/427 |
| 6,504,539 B1 * | 1/2003 | Hiraki | 345/427 |
| 7,963,833 B2 * | 6/2011 | Novak et al. | 463/2 |
| 2002/0103031 A1 * | 8/2002 | Neveu et al. | 463/49 |
| 2006/0084509 A1 * | 4/2006 | Novak et al. | 463/49 |

OTHER PUBLICATIONS

Japan Office action, dated Mar. 26, 2013 along with an English translation thereof.

* cited by examiner

Fig. 2

DISPLAY IMAGE INFORMATION MANAGING TABLE

| GAME IMAGE ID | HIERARCHICAL ORDER (CONSTITUENT LAYER NUMBER) | MOVEMENT AMOUNT OF LAYER IMAGE | DISPLAY RANGE | ... | TARGET OBJECT FLAG |
|---|---|---|---|---|---|
| 0001 | 1 | LARGE | ... | ... | 0 |
| | 2 | MEDIUM | ... | ... | 0 |
| | 3 | SMALL | ... | ... | 1 |

VIDEO GAME PROCESSING APPARATUS AND VIDEO GAME PROCESSING PROGRAM

CROSS REFERENCE TO RELATED APPLICATION

The present disclosure relates to subject matter contained in Japanese Patent Application No. 2011-060324 filed on Mar. 18 2011, the disclosure of which is expressly incorporated herein by reference in its entirety.

BACKGROUND OF THE INVENTION

1. Field of the Invention

The present invention relates to technique to control progress of a video game.

2. Description of the Related Art

Heretofore, various video games including a video game called an RPG (role-playing game: a game in which a player plays a role of a character in a world of the game, and accomplishes a predetermined object while enjoying a process that the character grows through various experiences) and a simulation game have been provided.

In video game processing apparatuses for carrying out such a video game, there are many ones in which a game story is developed by clicking an object hidden on a screen using a pointing device such as a mouse. For example, one video game processing apparatus includes a storage section for storing a base image and a superimposing image arranged on the base image; creates a comparison target image containing a first image and a second image by arranging the superimposing image on the base image; receives input information for specifying a different portion of the comparison target image; and determines whether the input information satisfies a predetermined condition or not, whereby it is achieved to provide a video game that searches for a different portion of a comparison image (see, for example, Japanese Patent Application Publication No. 2007-209482, which is referred to as "Patent Literature 1").

As one of such video games, there is a game of a category, a so-called hidden game (hidden video game).

In a conventional hidden game, a display screen is constructed from a 2D image, and a level of difficulty and/or variation of the hidden game are adjusted by causing an object (which is to be found out by a player) to slip into a background or other object to set up the object to a hardly found state.

However, in the conventional hidden game, there are a few operations that a user (player) can carry out other than an operation to search out a target object from a game image displayed on a display screen, which is set up as a clear condition of the hidden game. For that reason, there has a problem that the user of the hidden game gets tired of the hidden game in a case where the user cannot find out the target object for a long time.

SUMMARY OF THE INVENTION

The present invention has been made in order to solve the problem described above, and it is an object of the present invention to improve interest in a hidden game of a player.

In order to achieve the above object, in one aspect of the present invention, the present invention is directed to a video game processing apparatus. The video game processing apparatus according to the present invention is a video game processing apparatus for controlling progress of a video game by receiving specification by a player to a predetermined target object in an image displayed on a display screen of a display section.

The video game processing apparatus includes a game image information memory for storing game image information, the game image information containing positional information of a target object in a game image used in the video game.

The video game processing apparatus also includes a viewpoint position specifier for specifying a position of a viewpoint against the game image on the basis of the progress of the video game.

The video game processing apparatus also includes a game image display controller for causing the display section to display a game image on the display screen on the basis of the position of the viewpoint specified by the viewpoint position specifier and the game image information stored in the game image information memory.

The video game processing apparatus also includes a viewpoint movement request receiver for receiving a movement request of the viewpoint from the player.

The video game processing apparatus also includes a display determiner for determining whether the target object becomes a non-display state or not in response to the movement request of the viewpoint received by the viewpoint movement request receiver.

The video game processing apparatus also includes a target object selection receiver for receiving selection of the target object by the player in a case where the display determiner determines that the target object does not become the non-display state.

By configuring it as described above, it is possible to improve interest in a hidden game of a player.

In the video game processing apparatus according to the present invention, it is preferable that the game image information contains game layer image information indicating layer images respectively drawn on a plurality of layers. In this case, the video game processing apparatus may further includes a display range determiner for determining a display range of each of the layer images respectively drawn on the plurality of layers indicated by the game layer image information contained in the game image information stored in the game image information memory, wherein the game image display controller causes the display section to display the game image in which the display ranges of the respective layer images of the plurality of layers determined by the display range determiner are superimposed in a hierarchical order defined in advance, wherein the viewpoint position specifier includes a layer movement amount specifier for specifying a movement amount of the layer image of each of the plurality of layers in response to the movement request of the viewpoint received by the viewpoint movement request receiver so as to be differentiated for every hierarchy, the layer images of the plurality of layers constituting the game image, wherein the display range determiner redetermines the display range of the layer image of each of the plurality of layers by causing the layer image of each of the plurality of layers to move in accordance with the specified movement amounts of the respective layer images in a case where the layer movement amount specifier specifies the movement amount of each of the layer images, and wherein the display determiner determines whether the target object becomes a non-display state or not on the basis of the display ranges redetermined by the display range determiner.

In the video game processing apparatus according to the present invention, it is preferable that the video game processing apparatus further includes: a target object determiner for determining at least one object of objects included in the game image as the target object in accordance with the progress of the video game; and an updater for updating information corresponding to the selected target object in a case where the target object selection receiver receives the selection of the target object by the player.

In the video game processing apparatus according to the present invention, it is preferable that the game layer image information contains layer movement information indicating a method of moving the layer images of the plurality of layers in response to the movement request of the viewpoint, and that the layer movement amount specifier specifies the movement amount of the layer image of each of the plurality of layers on the basis of the layer movement information.

In the video game processing apparatus according to the present invention, it is preferable that the layer movement amount specifier specifies the movement amount of the layer image of each of the plurality of layers so that a movement amount of a layer image of the layer whose hierarchical order is a front side is greater than a movement amount of a layer image of the layer whose hierarchical order is a back side.

In the video game processing apparatus according to the present invention, it is preferable that the display range determiner determines, as the display range, the layer image positioned within a predetermined display range specifying region that does not move even though the respective layer images of the plurality of layers move.

In the video game processing apparatus according to the present invention, it is preferable that the display range determiner includes: a condition satisfied determiner for determining whether a specific condition is satisfied or not due to movement of the layer image of each of the plurality of layers; and a display range specifying region mover for causing, in a case where the condition satisfied determiner determines that the specific condition is satisfied, the display range specifying region to move by means of a method of moving associated with the satisfied specific condition in advance, wherein the display range determiner redetermines, as the display range, the layer image positioned within a range of the display range specifying region moved by the display range specifying region mover among the layer images respectively drawn on the plurality of layers.

In the video game processing apparatus according to the present invention, it is preferable that the specific condition relates to at least one of the movement amounts of the respective layer images of the plurality of layers.

In the video game processing apparatus according to the present invention, it is preferable that the layer image is a two-dimensional image.

Moreover, in another aspect of the present invention, the present invention is directed to a video game processing program for causing a video game processing apparatus to control an operation so as to control progress of a video game by receiving specification by a player to a predetermined target object in an image displayed on a display screen of a display section. The video game processing program according to the present invention causes the video game processing apparatus to execute steps including specifying a position of a viewpoint against the game image on the basis of the progress of the video game.

The steps also include displaying a game image on the display screen on the basis of the position of the viewpoint specified in the specifying a position of a viewpoint and game image information stored in a game image information memory, the game image information memory storing the game image information that contains positional information of the target object in a game image used in the video game.

The steps also include receiving a movement request of the viewpoint from the player.

The steps also include determining whether the target object becomes a non-display state or not in response to the movement request of the viewpoint received in the receiving a movement request of the viewpoint.

The steps also include receiving selection of the target object by the player in a case where it is determined that the target object does not become the non-display state in the determining whether the target object becomes a non-display state.

According to the present invention, it is possible to improve interest in a hidden game of a player.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing for showing an example of a storage state of display image information;

DETAILED DESCRIPTION OF THE INVENTION

Hereinafter, one embodiment of the present invention will be described with reference to the appending drawings.

Figure 1:
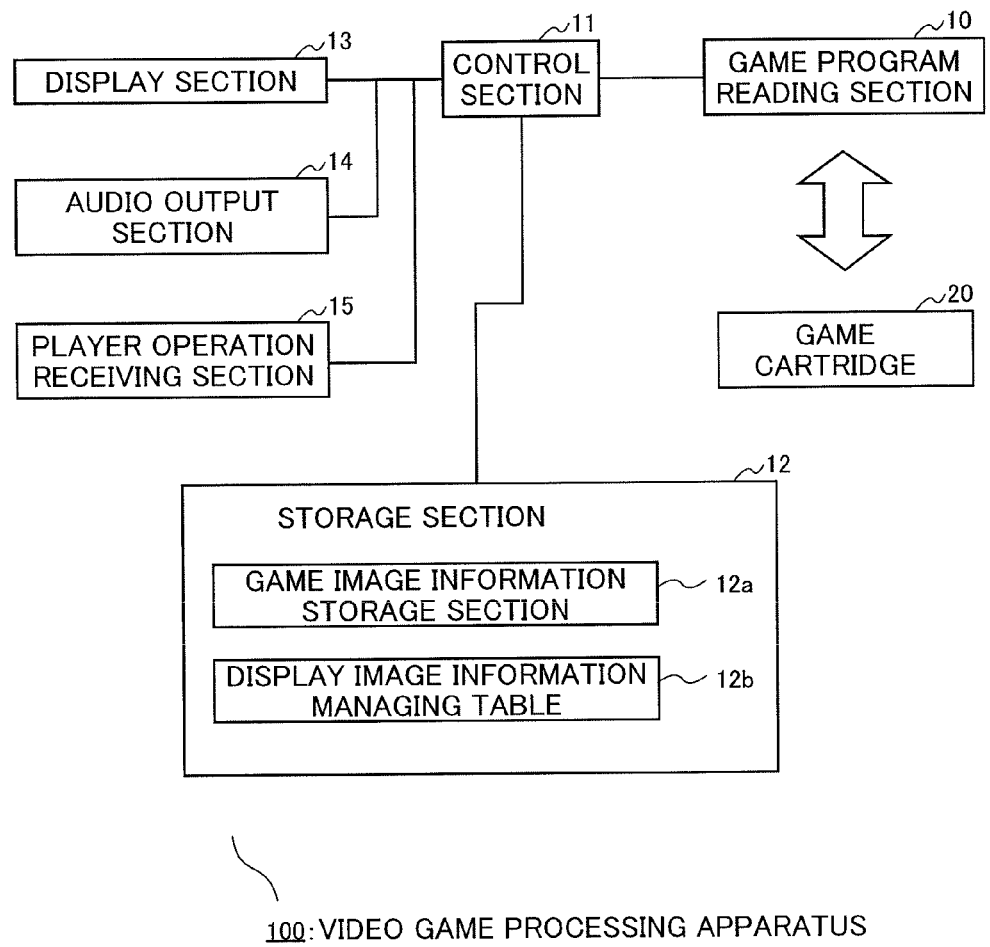
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio outputting section 14; and a player operation receiving section 15.

The game program reading section 10 detachably receives a game cartridge 20 into which a storage medium is embedded. A game program is stored in the storage medium. The game program reading section 10 reads out a necessary game program from the storage medium in the inserted game cartridge 20. In this regard, in this embodiment, a video game program classified into a hidden game is stored in the storage medium embedded into the game cartridge 20. However, a category to which the video game program stored in the storage medium embedded into the game cartridge 20 belongs is not limited to the hidden game, and the present invention can be applied to various kinds of categories of video games such as an RPG and a simulation game in which display of a game image (for example, two-dimensional image) is carried out.

The control section 11 has a function to carry out the game program read out by the game program reading section 10, and to carry out various kinds of controls for causing a video game to proceed in response to operations by a player.

In particular, the control section 11 according to the present embodiment carries out necessary control for: a viewpoint position specifying process for specifying a position of a viewpoint against the game image on the basis of progress of the video game; a game image displaying process for displaying the game image on a display screen on the basis of the position of the viewpoint specified in the viewpoint position specifying process and game image information stored in a game image information storage section 12a for storing the game image information containing positional information of a target object within the game image used in the video game; a viewpoint movement request receiving process for receiving a movement request of the viewpoint from the player; a display determining process for determining whether the target object becomes a non-display state or not in response to the movement request of the viewpoint received in the movement request of the viewpoint receiving process; and a target object select receiving process for receiving selection of the target object by the player in a case where it is determined in the display determining process that the target object does not become the non-display state. Further, the control section 11 also carries out, in a display range determining process, necessary control for a process to redetermine a display range of each of layer images of a plurality of layers by moving each layer image of the plurality of layers in accordance with a specified movement amount of each of the layer images in a case where the movement amount of each of the layer images is specified in a layer movement amount specifying process.

The storage section 12 is a storage medium for storing game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In the present embodiment, the storage section 12 includes a game image information storage section 12a and a display image information managing table 12b.

The game image information storage section 12a is a storage medium for storing game image information indicating game images used in the video game. The game image information contains positional information of a target object in a game image. In this regard, in the present embodiment, the game image information read out from the game cartridge 20 is stored in the game image information storage section 12a.

The game image information stored in the game image information storage section 12a contains game layer image information indicating a layer image of each of the plurality of layers in each of which a two-dimensional image is drawn. Here, the "layer" means a virtual sheet for drawing, which is used in a general image creating application. Namely, one game image is created by superimposing respective layer images of the plurality of layers.

Further, in the present embodiment, the game layer image information contains information indicating a relative positional relationship of respective layer images so as to be capable of taking two states including: a state (first state) in which a "target object" (will be described later) is displayed on the display screen with respect to layer images (including objects), which are images respectively drawn on the plurality of layers that constitute one game image (that is, a state in which the player can view the target object on the display screen); and a state (second state) in which the "target object" is not displayed on the display screen.

In this regard, in the present embodiment, in a case where an operational input by the player to the game image displayed on the display screen is received, the control section 11 causes each layer image of the plurality of layers to be moved and thus causes a display form of the game image to be changed so that the game image during display becomes the first state or second state. Namely, the control section 11 may cause the target object, which is an object that the player is to select for clearing the hidden game, to become an invisible state by the player in response to an operation from the player.

The display image information managing table 12b is a storage medium for storing display image information that is information on a display image (game image) to be displayed on the display screen of the display section 13. In the present embodiment, a part of the game images (in particular, the game layer image information) according to progress of the video game is read out from the game image information storage section 12a and stored in the display image information managing table 12b by the control section 11.

FIG. 2 is an explanatory drawing for showing an example of a storage state of the display image information stored in the display image information managing table 12b. As shown in FIG. 2, the display image information contains: a game image ID for uniquely specifying game image information; a hierarchical order; a movement amount of a layer image; a display range; and a target object flag.

Here, the "hierarchical order" denotes a number indicating an anteroposterior relationship (positional relationship) of each of the plurality of layers indicated by the game layer image information, which is contained in the game image information. In the present embodiment, an order of hierarchies is indicated by numbers (constituent layer numbers), and a layer to which a constituent layer number "1" is set up denotes a layer of the most anterior surface. The larger the constituent layer number is, the backer the layer denotes. Namely, in the display image information shown in FIG. 2, a layer to which a constituent layer number "3" of the three layers constituting a game image of a game image ID "0001" is set up becomes the backest layer.

Further, the "movement amount of layer image" indicates a movement amount of the layer image according to a predetermined operation. In the present embodiment, the movement amount of the layer image with respect to the predetermined operation is set up for each layer. The predetermined operation and the movement amount of the layer image will de described later in detail (for example, see FIGS. 7A and 7B).

Further, the "display range" indicates a range in which an object is displayed on the display screen of the whole two-dimensional image drawn in each of the layers. Namely, in the present embodiment, at least one layer image of the layer images of the plurality of layers that constitute one game image (that is, image data to which a positional relationship against the other layers) is image data having a size of the display screen or larger in the case of normal display setup (that is, in a case where the image is displayed in a state in which the image is not enlarged or shrunk.

Figure 5A:
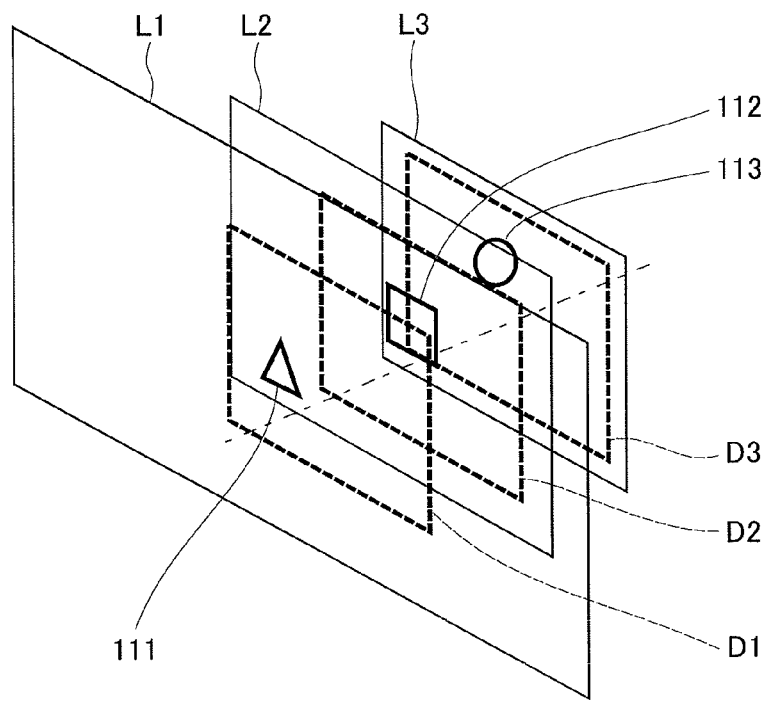
FIGS. 5A and 5B are explanatory drawings for explaining relevance between movement of a layer and the change in the display form of the game image.
Figure 5B:
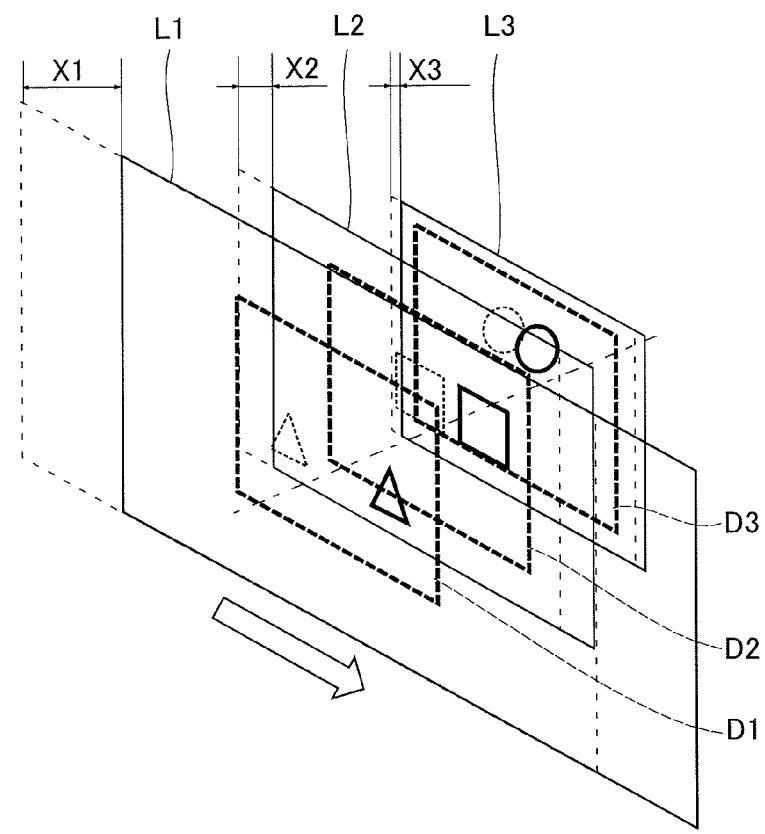

Further, a first display range of the image indicated by each of the layers is determined in accordance with a predetermined display range determining rule. In the present embodiment, as shown in FIGS. 5A and 5B (will be described later), positions of display range specifying regions D1, D2 and D3 that do not move even though each of a plurality of layers L1, L2 and L3 that constitute one game image moves are stored in the display image information managing table 12b in advance.

Further, the "target object flag" is a flag indicating a layer of a layer image containing an object that is determined to be an object (target object) as a selection target of the player in accordance with progress of the video game. In the present embodiment, the control section 11 determines an object set up as a game cleared condition of the hidden game (that is, an object that the player is to search out in the game image) as a "target object", and sets the target object flag of the layer containing the target object to "1". In this regard, a target object flag for each of the layers that do not contain the target object is set to "0".

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player via a controller constructed by a plurality of buttons, a mouse or the like, and notifies the control section 11 of its result. In the present embodiment, the player operation receiving section 15 is constructed by a touch panel.

Next, an outline of layer movement processing carried out by the video game processing apparatus 100 according to the present embodiment will be described.

Figure 3:
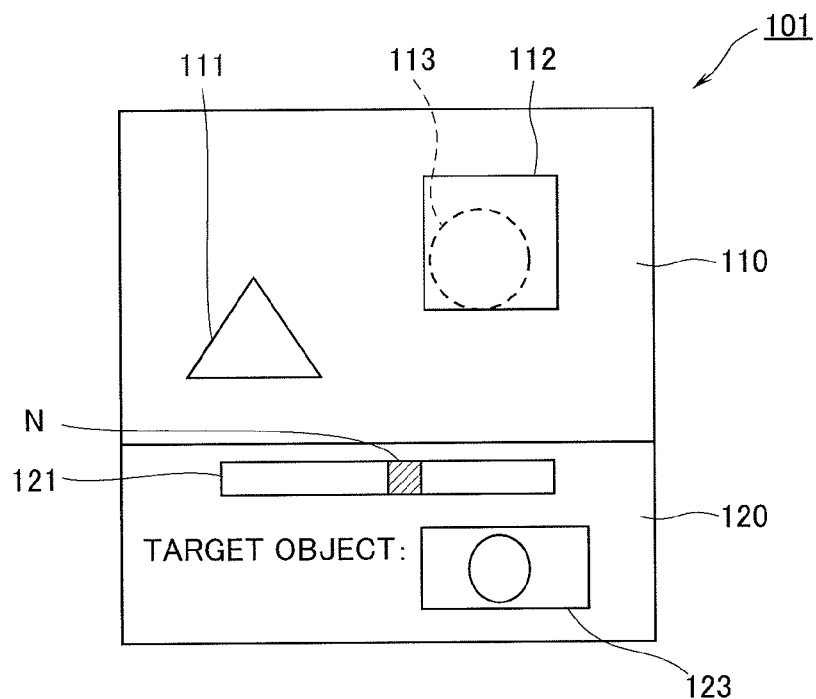
FIG. 3 is an explanatory drawing showing an example of a game screen for explaining an outline of a video game.

FIG. 3 is an explanatory drawing showing an example of the game screen for explaining an outline of the video game. As shown in FIG. 3, an image display region 110 for displaying a game image, and an information display region 120 for displaying information on progress of the video game and the like are provided in a game screen 101.

Further, in the present embodiment, as shown in FIG. 3, an operation bar 121 for receiving an operation of the player and a target object display region 123 for displaying an object (target object), which the player is to search out from the game screen, in the information display region 120.

Here, in the present embodiment, a knob N provided on the operation bar 121 fulfills a roll to receive a movement request of a viewpoint against the game image from the player (that is, a request for changing a display form of the game image). More specifically, the control section 11 receives, as a movement request of the viewpoint, a dragging operation with respect to the knob N (for example, an operation in which the player presses a display position of the knob N and moves the pressed position to other position while keeping a press state of the knob N). Namely, the control section 11 changes display forms of the game image in the image display region 110 in accordance with a position of the knob N on the operation bar 121 so that the viewpoint of the player in a virtual space (for example, a viewpoint of the player character operated by the player) is moved.

Further, information for causing the player to recognize the target object is displayed in the target object display region 123. Namely, as shown in FIG. 3, it may be configured so that the image of the target object is displayed, or a hint used by the player to guess the target object is displayed.

Hereinafter, the case where three objects 111, 112 and 113 are arranged in the image display region 110 will be explained as an example.

Figure 4:
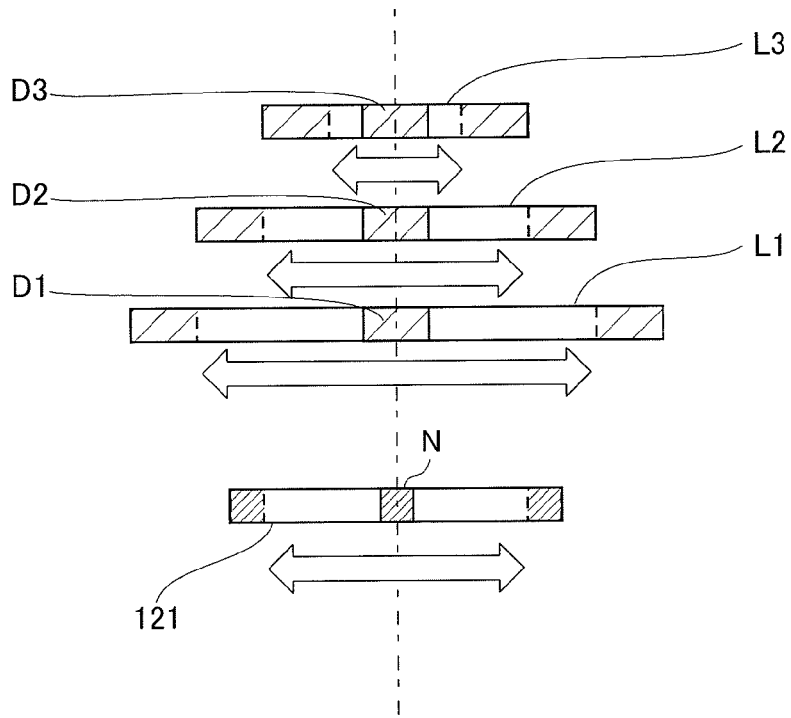
FIG. 4 is an explanatory drawing for explaining relevance between an operational input by a player and a change in a display form of a game image.

FIG. 4 is an explanatory drawing for explaining relevance between an operational input by the player (in the present embodiment, an operational input to the knob N provided on the operation bar 121) and a change in the display form of the game image (that is, movement of each of the plurality of layers with respect to the game image).

FIG. 4 shows: three layers L1, L2 and L3 that constitute one game image; display range specifying regions D1, D2 and D3 set up in the respective layers; and a position of the knob N on the operation bar 121 that corresponds to the three layers L1, L2 and L3. As shown in FIG. 4, a position of each of the display range specifying regions D1, D2 and D3 in the three layers L1, L2 and L3 is determined for each of the three layers L1, L2 and L3.

Namely, when the knob N is positioned at the middle of the operation bar 121, a position of each of the plurality of display range specifying regions D1, D2 and D3 is positioned at the middle of the corresponding layer L1, L2 or L3. When the knob N is then moved to the left end of the operation bar 121 by means of an operation of the player, the position of each of the plurality of display range specifying regions D1, D2 and D3 is positioned at the left end of the corresponding layer L1, L2 or L3. Further, when the knob N is positioned at the right end of the operation bar 121, the position of each of the plurality of display range specifying regions D1, D2 and D3 is positioned at the right end of the corresponding layer L1, L2 or L3.

In this regard, in the present embodiment, the three layers L1, L2 and L3 are moved in accordance with movement of the knob N, by which the position of each of the display range specifying regions D1, D2 and D3 is determined. Namely, the position of each of the display range specifying regions D1, D2 and D3 is fixed, and a two-dimensional image positioned in each of the display range specifying regions changes in a case where the corresponding layer is moved.

FIGS. 5A and 5B are explanatory drawings for explaining relevance between movement of the layer and the change in the display form of the game image.

As shown in FIG. 5A, the game image according to the present embodiment is created and displayed by superimposing the two-dimensional images positioned in the respective display range specifying regions D1, D2 and D3 of the plurality of layers L1, L2 and L3, which constitute one game image. Namely, in a situation shown in FIG. 5A, an object 111 drawn on the layer L1 that is positioned at the front is displayed so as to be superimposed on an object 112 and an object 113 respectively drawn on the layer L2 and the layer L3 that are positioned at the back of the layer L1. In this regard, in a case shown in FIG. 5A, the object 113 is hidden behind the object 112 (see FIG. 7A; will be described later).

FIG. 5B is an explanatory drawing for explaining a state when the knob N of the operation bar 121 is moved in the right direction from a state shown in FIG. 5A in the game screen 101 (that is, the direction from the object 111 toward the object 112).

As shown in FIG. 5B, in a case where the knob N is moved, the control section 11 causes the plurality of layers L1, L2 and L3 to move by movement amounts X1, X2 and X3, respectively. Then, since the positions of the display range specifying regions D1, D2 and D3 are fixed and the respective movement amounts of the plurality of layers L1, L2 and L3 are different from each other, the game image in which two-dimensional images positioned within the respective display range specifying regions are superimposed is differentiated from one with the state before the plurality of layers L1, L2 and L3 are moved. For that reason, when the two-dimensional images within the display range specifying regions of the respective layers are superimposed and displayed, the content of the game screen 101 (that is, the game image displayed in the image display region 110) is changed. In this regard, the respective movement amounts of the plurality of layers L1, L2 and L3 according to the present embodiment are determined on the basis of sizes of the respective layers (that is, a size as one piece of image).

Further, in the present embodiment, a creator of the video game and the like can change the display form of the game image so as to move the viewpoint (virtual viewpoint) with respect to the plurality of objects 111, 112 and 113 by creating game layer image information in advance so that the more anterior the layer is positioned on, the larger the movement amount of the layer becomes. Namely, for example, in the case shown in FIGS. 5A and 5B, by causing the knob N (see FIG. 3) to move to the right with respect to the game screen 101 in the state of FIG. 5A (that is, a state where apart of the object 113 is hidden behind the object 111 and the object 112) (that is, by causing the plurality of layers L1, L2 and L3 to move in the same direction), it is possible to change a positional relationship of the three objects 111, 112 and 113 so that the viewpoint of the player is moved to the left with respect to the game screen 101. Namely, for example, it is possible to realize an operation "the object 113 hidden behind the object 112 when viewed from the front becomes a visible state by changing the viewpoint" without using a plurality of game images respectively corresponding to a plurality of viewpoints.

Next, an operation of the video game processing apparatus 100 according to the present embodiment will be described.

Figure 6:
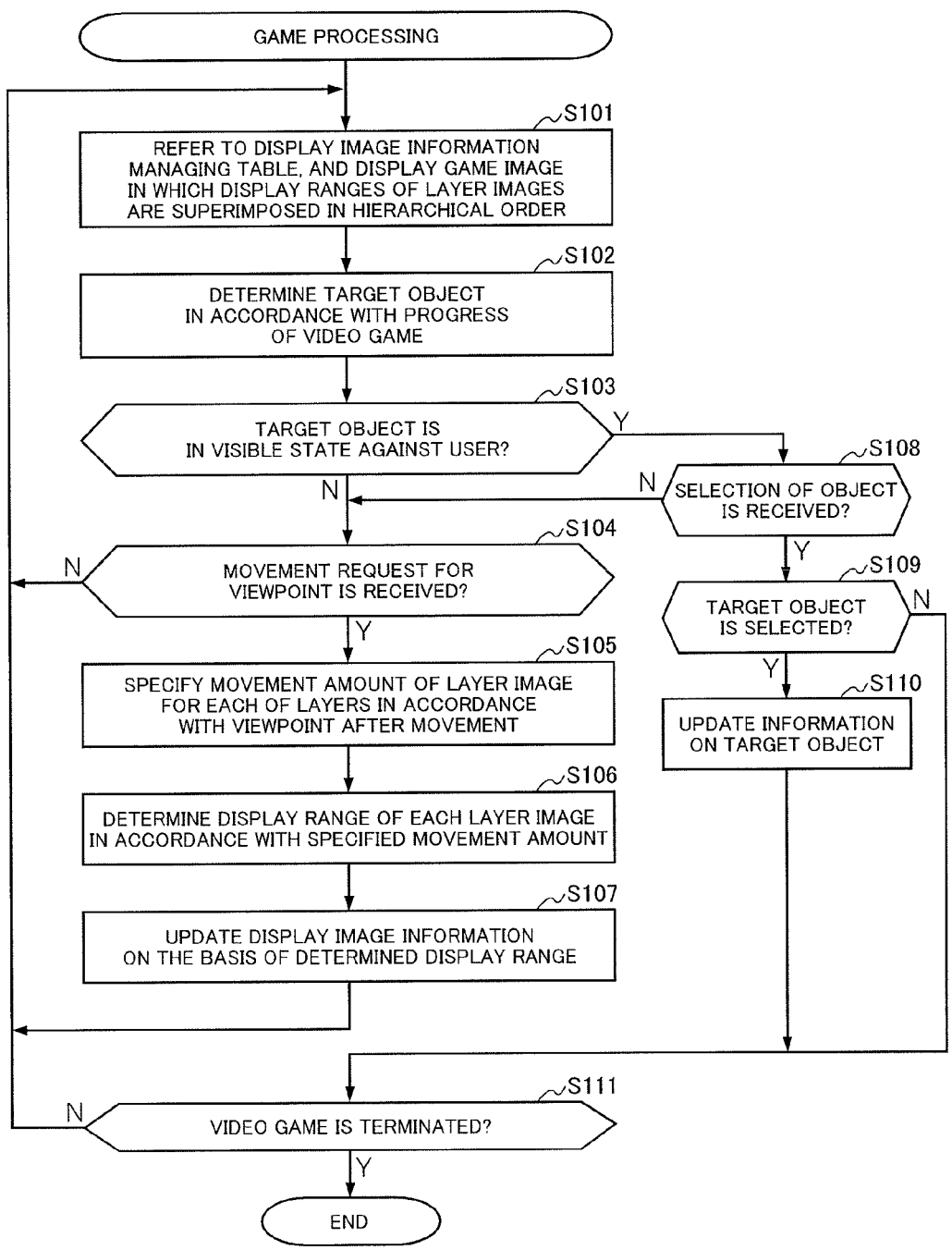
FIG. 6 is a flowchart showing an example of game processing.

FIG. 6 is a flowchart showing an example of damage specifying processing carried out by the video game processing apparatus 100. In game processing, a process to cause a hidden game to proceed is carried out by allowing a viewpoint of a player A to move in accordance with an operation by the player A of the video game processing apparatus 100. In this regard, general processing may be omitted.

The game processing according to the present embodiment is started in response to a situation that the control section 11 receives a request to start of the hidden game, for example.

In the game processing, the control section 11 first refers to the display image information managing table 12b, and displays a game image in which display ranges of layer images are superimposed in a hierarchical order (Step S101). In this regard, in the present embodiment, the case where the control section 11 displays the game screen including the game image shown in FIG. 3 will be described as an example.

When the game image is displayed, the control section 11 determines a target object in accordance with progress of the video game (Step S102). In the present embodiment, the case where the control section 11 determines that a circular object (that is, the object 113 in FIG. 3) that is a layer image of the layer to which a constituent layer number "3" is set up is a target object will be described as an example.

When the target object is determined, the control section 11 refers to the display image information managing table 12b, and determines whether the target object 113 is in a visible state against the player A or not (that is, whether the player A can view the target object 113 or not) (Step S103).

Here, in a case where it is determined that the target object 113 is not in the visible state ("No" at Step S103), the control section 11 determines whether a movement request for a viewpoint is received or not (Step S104). Here, in a case where it is determined that no movement request for the viewpoint is received ("No" at Step S104), the control section 11 causes the processing flow to proceed to the process at Step S101.

On the other hand, in a case where it is determined that the movement request for the viewpoint is received, for example, by receiving a predetermined operation by the player A ("Yes" at Step S104), the control section 11 specifies a movement amount of the layer image for each of the plurality of layers in accordance with the viewpoint after movement (Step S105). In the present embodiment, the control section 11 specifies the movement amount of each of the layers from the current position on the basis of the received movement request of the viewpoint. Namely, the control section 11 specifies arrangement of the respective layer images in response to the movement request for the viewpoint instead of specifying a position of a viewpoint (or viewpoint) in the virtual space. In this regard, in the present embodiment, in a case of displaying the game image at the beginning, the control section 11 displays a game image at the viewpoint set up in advance as a reference position (that is, the game image in which layer images are arranged at the positions set up in advance).

Further, at this time, the control section 11 specifies the movement amount of the layer image of each of the plurality of layers so as to be differentiated for every hierarchy. In this regard, in the present embodiment, by creating the game layer image information so as to make a difference in movement amounts of layer images for every hierarchy of a game image with respect to a movement request of one viewpoint, it is possible to specify the movement amounts so as to be differentiated for every hierarchy. In this regard, a layer image having a layer image and a movement amount that correspond with those of other layer are included in the layer images of the plurality of layers that constitutes one game image.

When the movement amount for each of the plurality of layers is specified, the control section 11 determines a display range of a layer image of each of the plurality of layers in accordance with the specified movement amount (Step S106).

In a case where the display range of the layer image of each layer is determined, the control section 11 updates the display image information on the basis of the determined display range (Step S107), and causes the processing flow to proceed to the process at Step S101. Namely, the control section 11 again displays the game screen including the game image, in which the display ranges of the layer images are superimposed in a hierarchical order, on the basis of the display image information after update (Step S101).

Figure 7A:
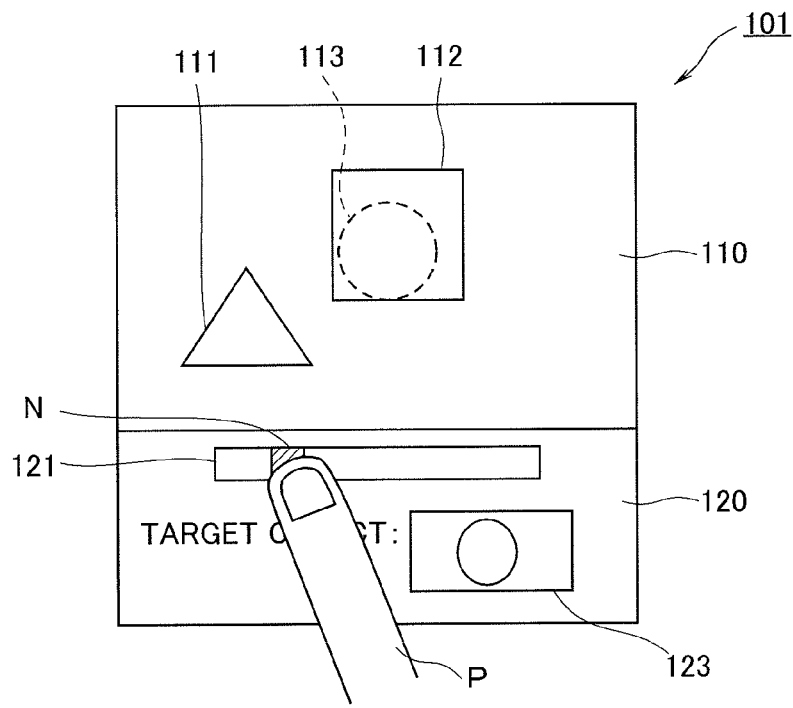
FIGS. 7A and 7B are explanatory drawings for explaining an example of a game screen.
Figure 7B:
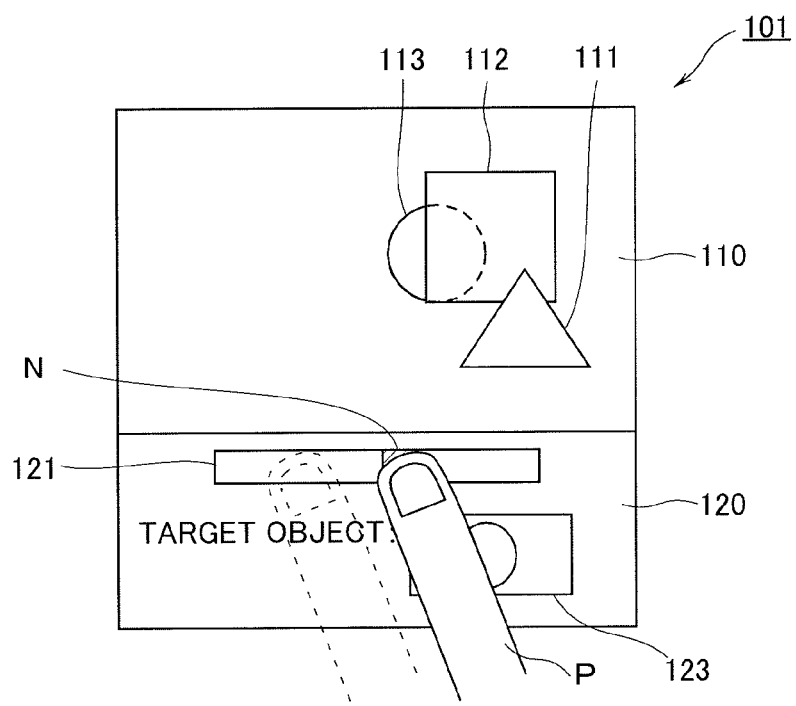

FIGS. 7A and 7B are explanatory drawings for explaining an example of the game screen 101 displayed on the basis of the display image information. For example, at Step S104 in the game processing (see FIG. 6), as shown in FIGS. 7A and 7B, when a movement operation by a finger P of the player A against the knob N on the operation bar 121 provided in the game screen 101 (for example, the dragging operation against the knob N) is received, the control section 11 receives this movement operation as a movement request of the viewpoint (that is, as a display form changing request of the game image included in the game screen during display) ("Yes" at Step S104). The control section 11 then changes the content of the game screen 101 by carrying out the processes after Step S105 (Steps S105, S106, S107 and S101) in response to the received movement request of the viewpoint. Namely, for example, as shown in FIG. 7B, the control section 11 changes the display form (display content) of the game image displayed in the image display region 110 in the game screen 101 shown in FIG. 7A as well as the position of the knob N.

By configuring it so that the object 113 hidden behind the object 112 can be displayed like the change of the game screen 101 from FIG. 7A to FIG. 7B in response to an operation of the player A, it becomes possible to provide operability to the player A as if the position of the viewpoint within the video game is moved in response to a user's own operation.

In this regard, although the case where the plurality of layers L1, L2 and L3 that constitute the game image are moved in the same direction as a moving direction of the knob N by the respective different movement amounts has been explained in the present embodiment, it may be configured so that the respective layers are moved in the different direction from the moving direction of the knob N (for example, opposite direction).

On the other hand, in a case where it is determined in the process at Step S103 that the target object 113 is in the visible state against the player A (for example, which is not the state as shown in FIG. 7A, but the state where at least a part of the target object 113 is displayed in the image display region 110 as shown in FIG. 7B) ("Yes" at Step S103), the control section 11 determines whether selection of an object included in the game image during display (in the present embodiment, at least one of the three objects 111, 112 and 113) is received or not (Step S108). Here, in a case where it is determined that selection of an object is not received ("No" at Step S108), the control section 11 causes the processing flow to proceed to the process at Step S104.

On the other hand, in a case where it is determined that selection of an object (selection operation) is received, for example, by detecting that any display position of the three objects 111, 112 and 113 included in the game image during display is pressed by the finger P of the player A ("Yes" at Step S108), the control section 11 determines whether the target object 113 is selected or not (Step S109). Here, in a case where it is determined that the target object 113 is not selected ("No" at Step S109), the control section 11 causes the processing flow to proceed to a process at Step S111 (will be described later).

On the other hand, in a case where it is determined that the target object 113 is selected (that is, in a case where it is detected that the position at which the object 113 is displayed on the display screen is pressed) ("Yes" at Step S109), the control section 11 updates the information on the target object 113 (Step S110). In the present embodiment, the control section 11 stores the fact that the target object 113 is selected in the storage section 12, and deletes (or changes) the "display corresponding to the selected target object 113" in the target object display region 123.

When the information on the target object 113 is updated, the control section 11 determines whether a termination condition of the video game is satisfied or not (Step S111). Here, in a case where it is determined that the termination condition of the video game is not satisfied ("No" at Step S111), the control section 11 causes the processing flow to proceed to the process at Step S101.

On the other hand, in a case where it is determined that the termination condition of the video game is satisfied, for example, by storing the fact that the target object 113 is selected ("Yes" at Step S111), the control section 11 terminates the processes herein.

As explained above, in one embodiment described above, the video game processing apparatus 100 for controlling progress of a video game by receiving specification by the player A to a predetermined target object in an image displayed on a display screen of a display section (for example, the display section 13) is configured so as to: include the game image information storage section 12a for storing game image information, the game image information containing positional information of the target object 113 in a game image used in the video game; specify a position of a viewpoint against the game image on the basis of the progress of the video game (for example, specifies an arrangement of the respective layer images); cause the display section 13 to display a game image on the display screen on the basis of the p specified position of the viewpoint and the game image information stored in the game image information storage section 12a (for example, the game image information readout from the game image information storage section 12a to the display image information managing table 12b); receive a movement request of the viewpoint from the player A (for example, receive a movement operation for the knob N displayed in the game screen 101); determine whether the target object 113 becomes a non-display state or not in response to the received movement request of the viewpoint (for example, whether the target object 113 is in a state in which the player A can view the target object 113 or not); and receive selection of the target object 113 by the player in a case where it is determined that the target object 113 does not become the non-display state. Therefore, it becomes possible to improve interest in the hidden game of the player.

Namely, by introducing movement of a viewpoint into a hidden game, it is possible to display an object to be found out on the display screen or set the object to a non-display state. Therefore, it is possible to provide ranges to an operation of the player, and it becomes possible to improve interest in the video game of the player.

Further, in the embodiment described above, the video game processing apparatus 100 may be configured so that: the game image information contains game layer image information indicating layer images respectively drawn on a plurality of layers; the video game processing apparatus 100 determines a display range (for example, the two-dimensional image within each of the display range specifying regions D1, D2 and D3) of each of the layer images (for example, the three objects 111, 112 and 113 (one is drawn on each of the three layers L1, L2 and L3)) respectively drawn on the plurality of layers (for example, the three layers L1, L2 and L3) indicated by the game layer image information contained in the game image information stored in the game image information memory 12a; the video game processing apparatus 100 causes the display section (for example, the display screen of the display section 13) to display the game image in which the determined display ranges of the respective layer images of the plurality of layers are superimposed in a hierarchical order defined in advance (for example, to display the game image by superimposing the images in the display range specifying regions D1, D2 and D3); the video game processing apparatus 100 specifies the movement amount (for example, the movement amounts X1, X2 and X3) of the layer image of each of the plurality of layers in response to the received movement request of the viewpoint so as to be differentiated for every hierarchy, the layer images of the plurality of layers constituting the game image; the video game processing apparatus 100 redetermines the display range of the layer image of each of the plurality of layers by causing the layer image of each of the plurality of layers to move in accordance with the specified movement amounts of the respective layer images in a case where the movement amount of each of the layer images is specified (for example, specifies the display range of each of the layers in accordance with the specified movement amount); and the video game processing apparatus 100 determines whether the target object becomes a non-display state or not on the basis of the determined display ranges. Therefore, compared with a method of displaying an image on the display screen by arranging a three-dimensional object in a virtual 3D space and perspectively transforming this object, it is possible to realize operability for movement of a viewpoint without excessively increasing a processing speed and a capacity necessary for data.

Namely, since the game image to be displayed is changed due to the movement of the layers, it becomes possible to avoid a processing load and the amount of data from becoming enormous compared with the case using a virtual 3D space or the like.

Further, in the embodiment described above, the video game processing apparatus 100 may be configured so as to: determine at least one object (for example, the object 113) of the objects included in the game image (for example, the three objects 111, 112 and 113 displayed in the image display region 110) as the target object in accordance with the progress of the video game; and update information corresponding to the selected target object in a case where the selection of the target object by the player A is received (for example, store the fact that the target object is selected, and delete display of the selected target object in the target object display region 123). Therefore, it is possible to provide a hidden game of a new type that allows the player to carry out movement of multiple layers in response to an operation of the player to hide the object to be searched out by means of the player's own operation, and conversely, to search out the object hidden by being covered with any layer.

Further, in the embodiment described above, the video game processing apparatus 100 may be configured so that the game layer image information contains layer movement information indicating a method of moving the layer images of the plurality of layers L1, L2 and L3 (for example, the layer movement amount) in response to the movement request of the viewpoint (for example, the movement operation of the knob N); and the video game processing apparatus 100 specifies the movement amount X1, X2 and X3 of the layer image of each of the plurality of layers L1, L2 and L3 on the basis of the layer movement information. Therefore, by adjusting and setting up the movement amount of each of the plurality of layers, which constitute the game image, in accordance with the content of the game image in advance, it becomes possible to change the content of the game screen (that is, the display form of the game image to be displayed in the game screen) to be displayed in the display screen so that the viewpoint of the player is changed with more comfortable feeling (without any discomfort or unpleasant interference).

In this regard, in the embodiment described above, the video game processing apparatus 100 may be configured so that a player is allowed to change display forms of a game image on his or her own initiative. Therefore, it becomes possible to provide ranges to a method of searching a target object compared with a conventional hidden game, and as a result, it becomes possible to improve interest in the hidden game of the player.

Further, in one embodiment described above, the video game processing apparatus 100 may be configured so as to specify the movement amount of the layer image of each of the plurality of layers so that a movement amount of a layer image (for example, the object 111) of the layer whose hierarchical order is a front side is greater than a movement amount of a layer image of the layer whose hierarchical order is a back side. Therefore, it becomes possible to change the display forms of the game image so that the viewpoint of the player with respect to the game image is moved with more comfortable feeling (without any discomfort or unpleasant interference).

Further, in the embodiment described above, the video game processing apparatus 100 may be configured so as to determine, as the display range, the layer images (for example, the objects 111, 112 and 113) respectively positioned within the predetermined display range specifying regions D1, D2 and D3 that do not move even though the respective layer images of the plurality of layers L1, L2 and L3 move. Therefore, it becomes possible to readily determine the display ranges in response to movement of the layers.

In this regard, although it has not been mentioned particularly in the embodiment described above, the video game processing apparatus 100 may be configured so as to: determine whether the specific condition is satisfied or not due to movement of the layer image (for example, the objects 111, 112 and 113) of each of the plurality of layers L1, L2 and L3; cause, in a case where it is determined that the specific condition is satisfied, the display range specifying region (for example, the display range specifying regions D1, D2 and D3 respectively corresponding to the plurality of layers L1, L2 and L3) to move by means of a method of moving associated with the satisfied specific condition in advance; and redetermine, as the display range, the layer image positioned within a range of the display range specifying region moved by the display range specifying region mover among the layer images respectively drawn on the plurality of layers L1, L2 and L3.

Figure 8:
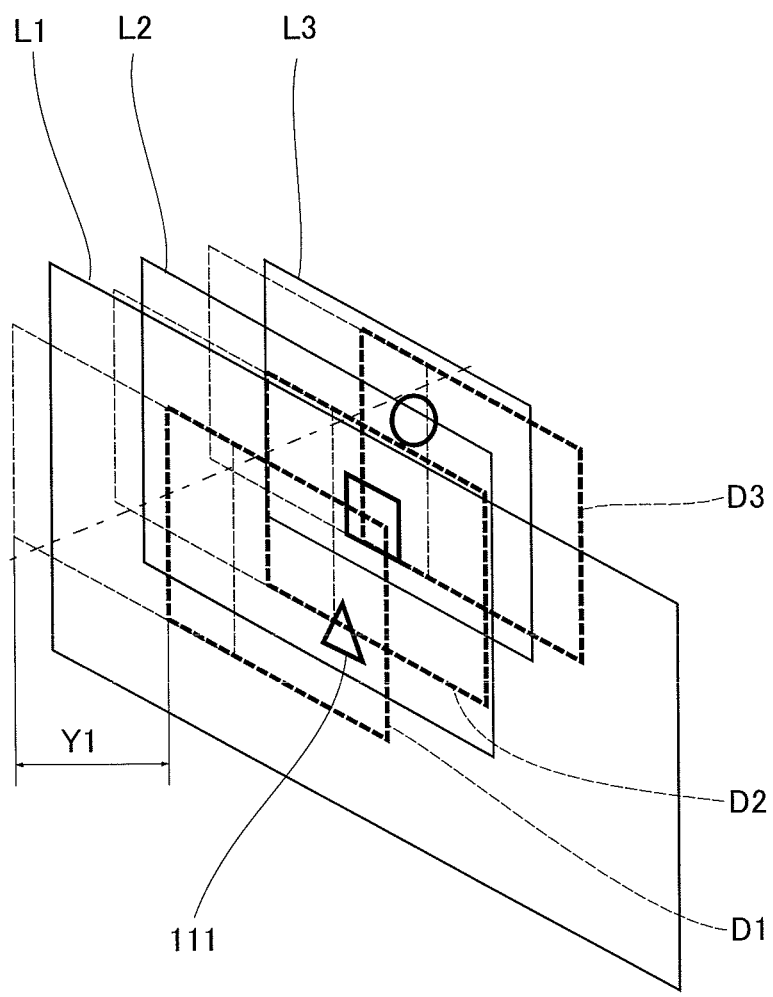
FIG. 8 is an explanatory drawing for explaining the case where a display range specifying region is moved.

FIG. 8 is an explanatory drawing for explaining the case where the display range specifying regions D1, D2 and D3 are moved. As shown in FIG. 8, when the plurality of layers L1, L2 and L3 are further moved in the same direction from the state of FIG. 5B and the object 111 drawn in the display range specifying region D1 on the layer L1 of the most anterior surface is not positioned within the display range specifying region D1 before the movement, the control section 11 determines that the specific condition is satisfied, and causes the display range specifying regions D1, D2 and D3 to be moved so as to be associated with each other. In this regard, it may be configured that the control section 11 determines a movement amount Y1 of the respective display range specifying regions D1, D2 and D3 at this time in accordance with the movement amount of the layer image of the layer L1 that is the most anterior surface, for example, or it may be configured that the control section 11 determines it in accordance with a movement amount associated with the satisfied specific condition in advance.

Figure 9A:
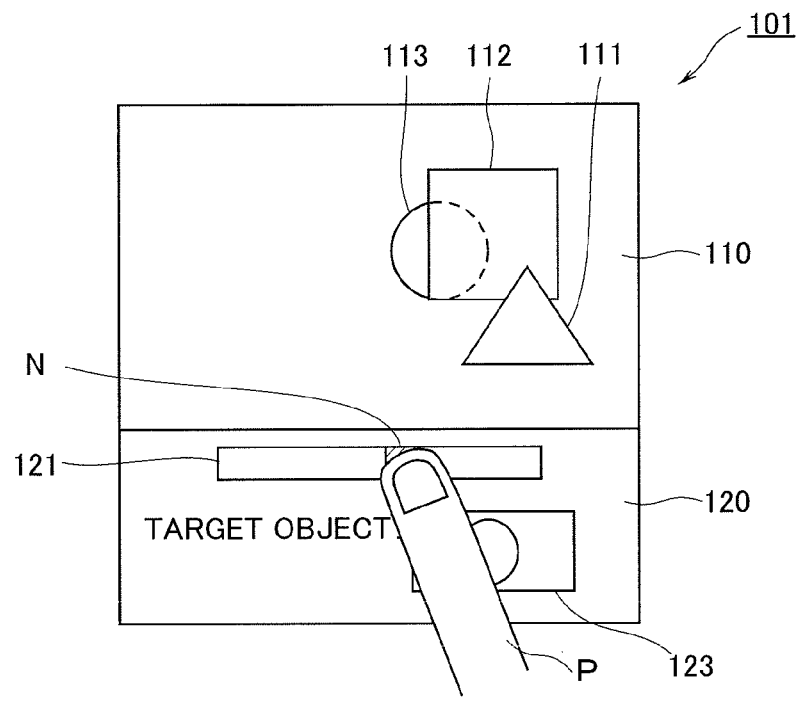
FIGS. 9A and 9B are explanatory drawings for explaining an example of the game screen.
Figure 9B:
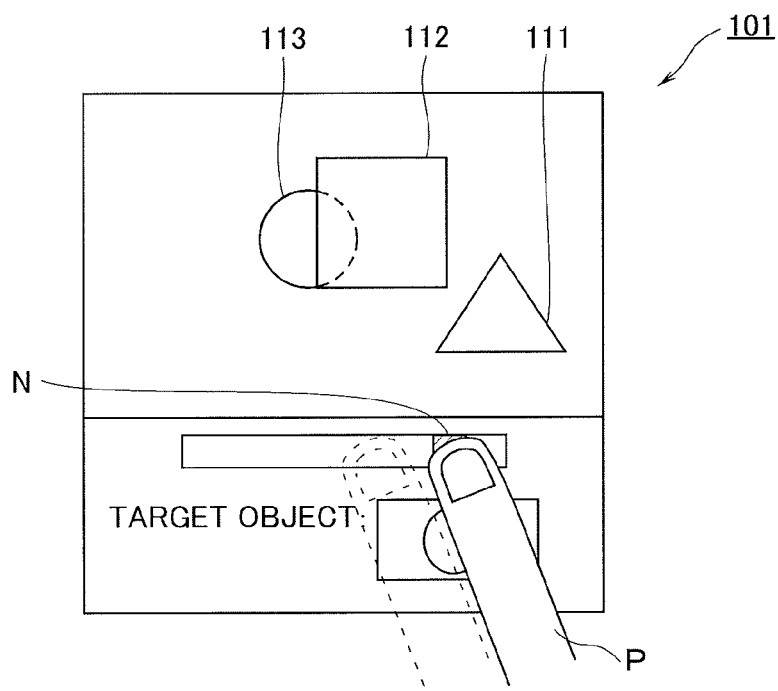

FIGS. 9A and 9B are explanatory drawings for explaining an example of the game screen 101 at this time. When the position of the knob N is further moved to the right with respect to the game screen 101 from the state of FIG. 9A by the player A (that is, when a dragging operation by the player A against the knob N is received), the control section 11 changes display forms of the game image displayed in the image display region 110 as shown in FIG. 9B. Namely, in the game screen 101, the positions of the plurality of objects 111, 112 and 113 included in the game image displayed on the image display region 110 are moved, and the content of the game image is changed in the form that a field of view of the player A also moves.

In this regard, as the "specific condition" used to determine movement of each of the display range specifying regions D1, D2 and D3, it may be configured so that a condition regarding at least one of the movement amounts of the respective layer images of the plurality of layers is set up, for example. Namely, the video game processing apparatus 100 may be configured so that the control section 11 causes the display range specifying region D1, associated with the layer image of the layer L1 in advance, to move in a case where the layer image of the layer L1 that is the most anterior surface is moved by a predetermined amount or more, for example.

Further, although it has not been mentioned particularly in the embodiment described above, the movement of the layer image (layer) is not limited to one direction (right-and-left direction), the layer image may be configured so as to be capable of moving in any of a plurality of directions (for example, a vertical (up-and-down) direction with respect to the game screen).

Further, in the embodiment described above, the video game processing apparatus 100 may be configured so that the layer image is a two-dimensional image. Therefore, compared with a method of arranging a three-dimensional object in a virtual 3D space, it is possible to carry out a change operation of viewpoints using image data that can be created without imposing an enormous workload, it is possible to reduce a capacity necessary for data and a processing load, and it becomes possible to heighten operability in the video game.

Namely, it becomes possible to realize operability for change of viewpoints using image data viewed from one virtual viewpoint, by which a workload becomes low. More specifically, a two-dimensional image that is an image in which a state of an arbitrary object viewed from one virtual viewpoint is drawn is constituted by a plurality of layers, and a positional relationship among the plurality of layers is changed in response to an operational input by a player. Therefore, it becomes possible to change the display forms of the game image as if the viewpoint against one image is changed. Therefore, it is possible to reduce a capacity necessary for data and a processing load as much as possible, and it becomes possible to heighten operability in the video game.

Further, in the embodiment described above, the game image constructed by a plurality of layers on each of which a two-dimensional image is drawn has been described. However, the video game processing apparatus 100 may be configured so as to: change the display forms of the game image by superimposing the respective layer images of the plurality of layers on which a three-dimensional image is drawn to display a three-dimensional game image, receiving a movement request of the viewpoint against the game image during display, and causing the layer images to move so that the movement amounts of the respective layer images of the plurality of layers are differentiated for every hierarchy.

In this regard, although it has not been mentioned particularly in the embodiment described above, the video game processing apparatus 100 may be configured so as to: determine whether the movement amount of the layer image of each of the plurality of layers according to the received movement request of the viewpoint exceeds a specific threshold value or not; and display the layer images by reversing hierarchical orders defined in advance for the layers and superimposing the respective layer images of the plurality of layers in the reversed hierarchical order in a case where it is determined that the movement amount exceeds the specific threshold value. By configuring it in this manner, it becomes possible to display the game image when the virtual viewpoint is moved to the back side of the game image. In this case, it is preferable that the display form of the game image is differentiated from the display form before a change of a virtual viewpoint by determining right and left of the layer image to display the layer image, for example.

Further, in the embodiment described above, the case where the video game processing apparatus 100 displays the game screen 101 provided with the image display region 110 and the information display region 120 including the operation bar 121 has been explained. However, the configuration of the game screen is not limited to this one. Namely, for example, it may be configured so that the operation bar 121 is not displayed within the game screen. In this case, the video game processing apparatus 100 may be configured so as to: detect a pressed position of the display screen by the player (for example, a contact location of a display section provided with a touch panel); calculate a vector value on the basis of a detection result; and cause the layers to move in accordance with the calculated vector value. In this case, the video game processing apparatus 100 may further be configured so as to specify an operation according to the calculated vector value on the basis of predetermined reference, for example. Namely, the video game processing apparatus 100 may be configured so that: in a case where a value represented by the calculated vector value denotes a sliding (or dragging) operation, movement of the layer is carried out; and in a case where a value represented by the calculated vector value denotes a touch operation, it is determined that selection of an object is carried out and a process according to the selected object is carried out.

Hereinafter, an example of the case where the video game processing apparatus 100 moves a layer by calculating a vector value according to an operation by the player A will be described with reference to the drawings.

Figure 10:
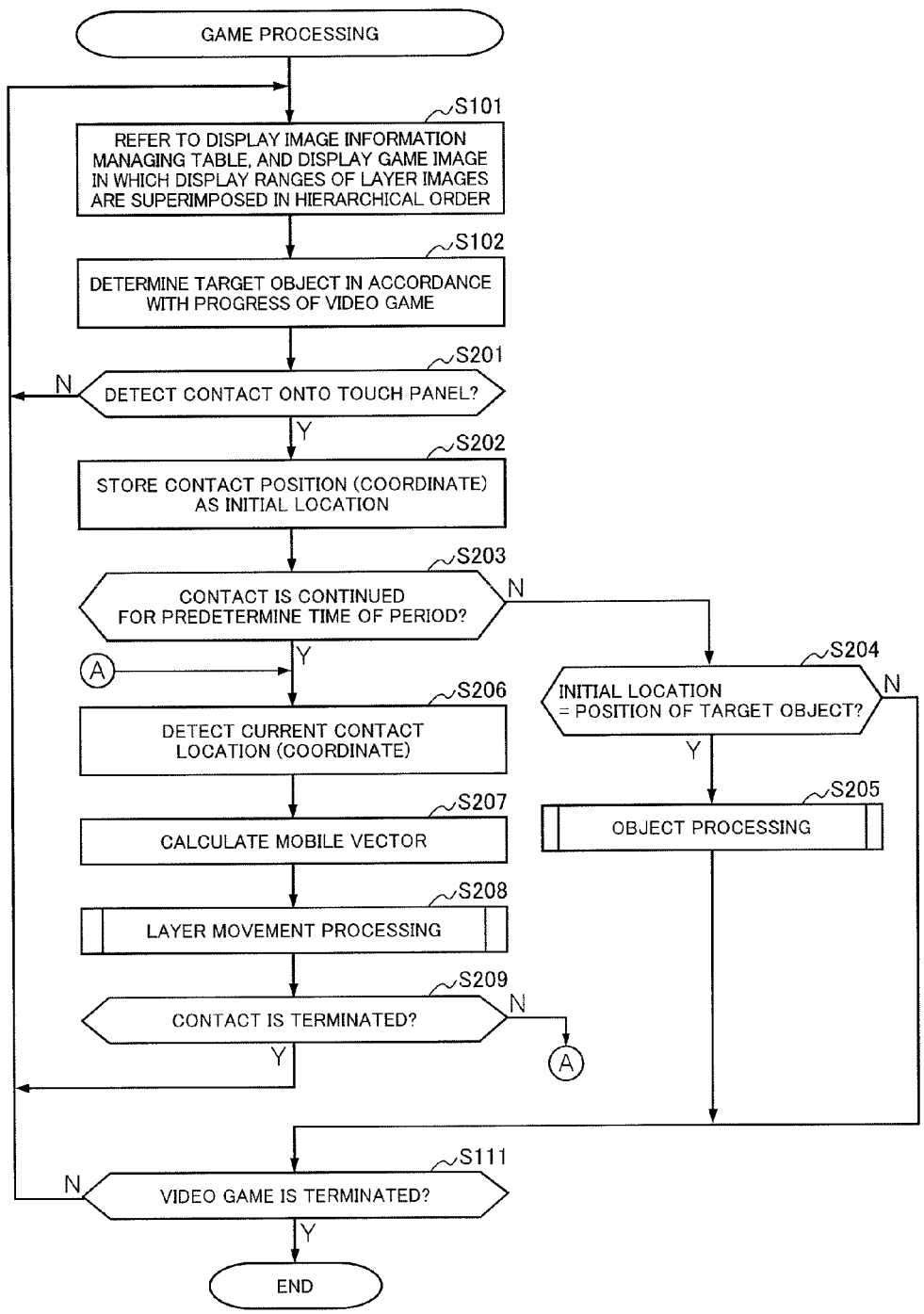
FIG. 10 is a flowchart showing another example of the game processing.

FIG. 10 is a flowchart showing another example of the game processing described above (see FIG. 6). In the game processing shown in FIG. 10, a process to cause the hidden game to proceed in response to an operation to the display screen by the player A is carried out. In this regard, general processing may be omitted. Further, the same step numbers are assigned to the same processes as those in the game processing described above, and its explanation may be omitted.

In the game processing, the control section 11 first displays a game image (Step S101).

Figure 11A:
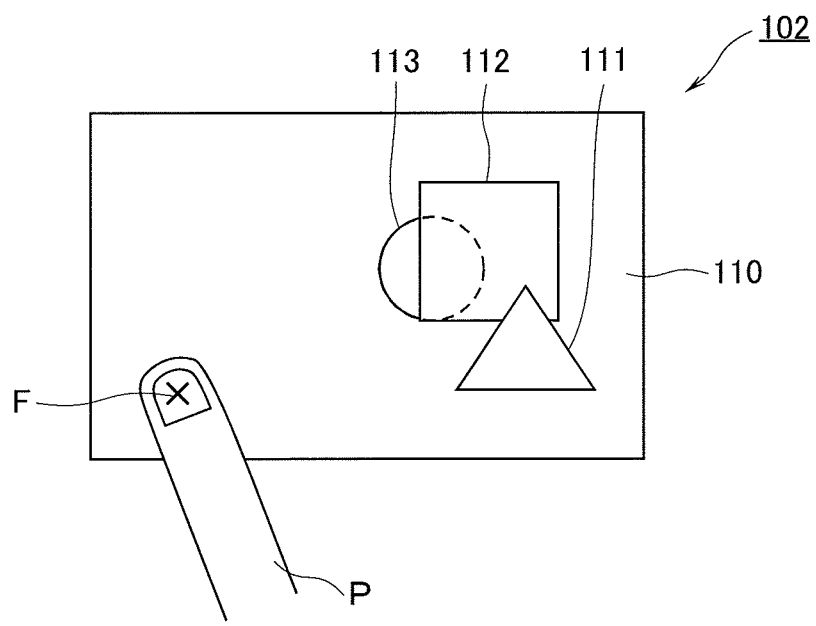
FIGS. 11A and 11B are explanatory drawings for explaining another example of the game screen.
Figure 11B:
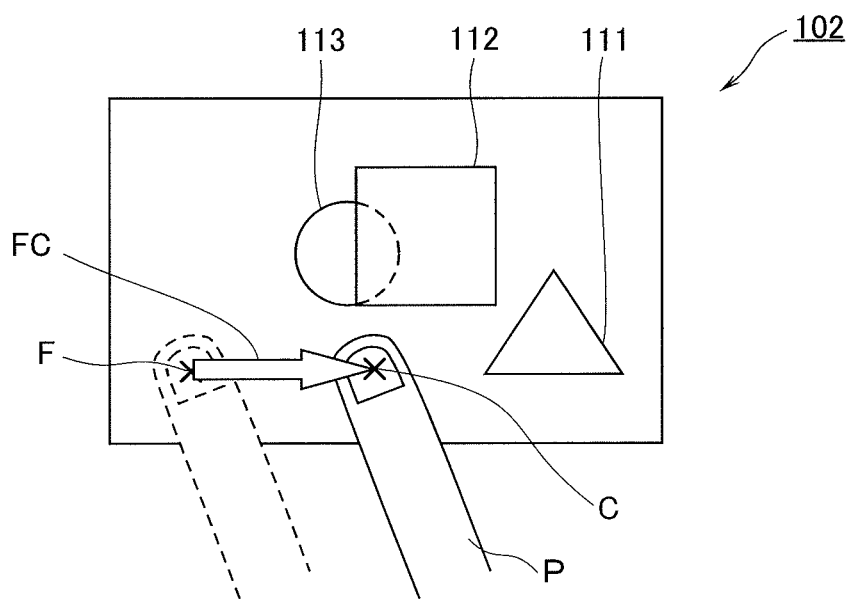

FIGS. 11A and 11B are explanatory drawings for explaining another example of the game screen. Since the operation bar 121 described above is not required in the present embodiment (see FIGS. 7A and 7B), the control section 11 causes the display section 13 to display a game screen 102 provided with only an image display region 110 for displaying a game image on the display screen, as shown in FIGS. 11A and 11B.

When the game image is displayed, the control section 11 determines a target object (Step S102). Hereinafter, the case where the control section 11 selects the object 113 as a target object in accordance with progress of the video game will be described as an example.

When the target object is determined, the control section 11 detects a contact onto the touch panel with which the display section 13 is provided (Step S201). Here, in a case where it is determined that no contact onto the touch panel is detected ("No" at Step S201), the control section 11 causes the processing flow to proceed to the process at Step S101.

On the other hand, for example, as shown in FIG. 11A, in a case where it is determined that the contact onto the touch panel caused by pressing the game screen 102 by means of the finger P of the player A is detected ("Yes" at Step S201), the control section 11 stores (or saves) a contact location (for example, a coordinate indicating the contacted position) in a predetermined storage area as an initial location F (Step S202).

When the initial location F is stored, the control section 11 determines whether or not the contact is continued for a predetermined period of time or more (Step S203). Here, in a case where it is determined that the contact is not continued for the predetermined period of time or more and is terminated ("No" at Step S203), the control section 11 determines whether the initial location F is the position (display position) of the target object 113 or not (Step S204). Namely, in a case where a so-called tap operation by the player A is received, the control section 11 determines whether a target of a tap operation is the target object 113 or not.

Here, in a case where it is determined that the initial location F is not the position of the target object 113 ("No" at Step S204), the control section 11 carries out termination determination of the video game (Step S111).

On the other hand, in a case where it is determined that the initial location F is the position of the target object 113 ("Yes" at Step S204), the control section 11 carries out predetermined object processing (Step S205). The object processing to be carried out herein may be a process according to the situation that the target object 113 is selected. In the present embodiment, the control section 11 updates the information on the target object 113 (Step S110 in FIG. 6).

When the object processing is carried out, the control section 11 carries out termination determination of the video game (Step S111).

On the other hand, in a case where it is determined at Step S203 in the game processing that the contact onto the touch panel continues for a predetermined period of time or more ("Yes" at Step S203), the control section 11 detects a current contact location (Step S206). In this regard, in the present embodiment, the control section 11 detects a contact location when the predetermined period of time elapses (current contact location C; see FIG. 11B).

When the current contact location C is detected, the control section 11 calculates mobile vector (Step S207). In the present embodiment, the control section 11 calculates, as a mobile vector FC, a vector having a direction from the initial location F (coordinate: (x1, y1)) toward the current contact location C (coordinate: (x2, y2)) as a direction of the vector and a distance between the initial location F and the current contact location C as a magnitude of the vector.

When the mobile vector FC is calculated, the control section 11 carries out the layer movement processing (Step S208). In the present embodiment, the control section 11 determines a moving direction and a moving distance in accordance with the calculated direction and magnitude of the mobile vector FC. Further, the control section 11 carries out determination of a display range of each of the layer images, and update of the display image information in the layer movement processing (Steps S106, S107 in FIG. 6).

When the layer movement processing is carried out, the control section 11 determines whether the contact onto the touch panel is terminated or not (Step S209). Here, in a case where it is determined that the contact is terminated ("No" at Step S209), the control section 11 causes the processing flow to proceed to the process at Step S206. By configuring it in this manner, a series of processes from detection of a contact location (in the present embodiment, current contact location C) to the layer movement processing is carried out for every predetermined period of time (Steps S206 to S208).

On the other hand, in a case where it is determined that the contact is terminated ("Yes" at Step S209), the control section 11 causes the processing flow to proceed to the process at Step S101, and causes the display section 13 to display the game image based upon the display image information updated in accordance with the mobile vector FC, for example, as shown in FIG. 11B.

In this regard, the control section 11 may be configured so as to carry out a process to display the game image based upon the display image information after update in the layer movement processing (Step S208). By configuring the control section 11 in this manner, the player A is allowed to move his or her viewpoint multiple times (that is, to change the display forms of the game image) by means of a series of movement operations of the pressed position (that is, the dragging operation). Therefore, it becomes possible to improve operability of the video game (hidden game). In this case, it maybe configured so that the control section 11 sets the current contact location C to a new initial location, or so that the control section 11 sets the contact location when a predetermined period of time further elapses to a new current contact location.

In this regard, in the embodiment described above, the video game processing apparatus 100 has been configured so as to carry out various kinds of processing such as the game processing described above on the basis of the game program read out from the game cartridge 20. However, the game program may be acquired from a game server via a communication network such as the Internet. Further, the video game processing apparatus 100 may serve as a game server to provide a game terminal with the game program via a communication network.

Further, in the embodiment described above, the video game processing apparatus 100 carries out various kinds of processing described above in accordance with a control program (video game processing program, which may merely be called a game program or program) stored in a storage device (the storage section 12) equipped by the video game processing apparatus 100.

In this regard, although the video game processing apparatus 100 is configured so that the video game is caused to proceed by operations of one player (that is, the player A) in the embodiment described above, it may be configured so that the video game is caused to proceed by operations of a plurality of players. In this case, for example, the video game processing apparatus 100 may be configured so that a player who satisfies a predetermined condition in the course of progress of the video game is allowed to request movement of layers.

The present invention is useful to provide a hidden game with high interest of a player.

What is claimed is:

1. A video game processing apparatus that controls progress of a video game by receiving a specification by a player to a predetermined target object in an image displayed on a display screen of a display section, the video game processing apparatus comprising:
a game image information memory configured to store game image information, the game image information corresponding to a two-dimensional image which includes positional information of a target object in a game image used in the video game;
a viewpoint position specifier configured to specify a position of a viewpoint against the game image based on the progress of the video game;
a game image display controller configured to cause the display section to display a game image on the display screen based on the position of the viewpoint specified and the game image information stored in the game image information memory, the game image including the two-dimensional image;
a viewpoint movement request receiver configured to receive a movement request of the viewpoint from the player;
a display determiner configured to determine whether the target object included in the two-dimensional image becomes a display or non-display state in response to the movement request of the viewpoint received by the viewpoint movement request receiver; and a target object selection receiver configured to receive a selection of the target object by the player when the display determiner determines that the target object does not become the non-display state, wherein the game image information includes game layer image information indicating layer images respectively drawn on a plurality of layers, wherein the video game processing apparatus further comprises:

a display range determiner configured to determine a display range of each of the layer images respectively drawn on the plurality of layers indicated by the game layer image information included in the game image information stored in the game image information memory, wherein the game image display controller causes the display section to display the game image in which the display ranges of the respective layer images of the plurality of layers determined by the display range determiner are superimposed in a hierarchical order defined in advance, wherein the viewpoint position specifier includes a layer movement amount specifier configured to specify a movement amount of the layer image of each of the plurality of layers in response to the movement request of the viewpoint received by the viewpoint movement request receiver so as to be differentiated for every hierarchy, the layer images of the plurality of layers constituting the game image, wherein the display range determiner re-determines the display range of the layer image of each of the plurality of layers by causing the layer image of each of the plurality of layers to move in accordance with the specified movement amounts of the respective layer images when the layer movement amount specifier specifies the movement amount of each of the layer images, and wherein the display determiner determines whether the target object becomes a display or non-display state based on the display ranges re-determiner by the display range determiner.

2. The video game processing apparatus according to claim 1, further comprising:

a target object determiner configured to determine at least one object of objects included in the game image as the target object in accordance with the progress of the video game; and an updater configured to update information corresponding to the selected target object when the target object selection receiver receives the selection of the target object by the player.

3. The video game processing apparatus according to claim 2, wherein the layer movement amount specifier specifies the movement amount of the layer image of each of the plurality of layers so that a movement amount of a layer image of the layer having a hierarchical order that is a front side is greater than a movement amount of a layer image of the layer having a hierarchical order that is a back side.

4. The video game processing apparatus according to claim 2, wherein the game layer image information includes layer movement information indicating a method of moving the layer images of the plurality of layers in response to the movement request of the viewpoint, and wherein the layer movement amount specifier specifies the movement amount of the layer image of each of the plurality of layers based on the layer movement information.

5. The video game processing apparatus according to claim 4, wherein the layer movement amount specifier specifies the movement amount of the layer image of each of the plurality of layers so that a movement amount of a layer image of the layer having a hierarchical order that is a front side is greater than a movement amount of a layer image of the layer having a hierarchical order that is a back side.

6. The video game processing apparatus according to claim 1, wherein the display range determiner determines, as the display range, the layer image positioned within a predetermined display range specifying region that does not move even though the respective layer images of the plurality of layers move.

7. The video game processing apparatus according to claim 6, wherein the display range determiner includes:

a condition satisfied determiner configured to determine whether a specific condition is satisfied due to movement of the layer image of each of the plurality of layers; and a display range specifying region mover configured to cause, when the condition satisfied determiner determines that the specific condition is satisfied, the display range specifying region to move by a method of moving associated with the satisfied specific condition, wherein the display range determiner re-determines, as the display range, the layer image positioned within a range of the display range specifying region moved by the display range specifying region mover among the layer images respectively drawn on the plurality of layers.

8. The video game processing apparatus according to claim 7, wherein the specific condition relates to at least one of the movement amounts of the respective layer images of the plurality of layers.

9. The video game processing apparatus according to claim 1, wherein the layer image is a two-dimensional image.

10. The video game processing apparatus according to claim 1, wherein the game image includes a plurality of the two-dimensional images.

11. A video game processing program product for causing a video game processing apparatus to control an operation to control progress of a video game by receiving a specification by a player to a predetermined target object in an image displayed on a display screen of a display section, the video game processing program causing the video game processing apparatus to execute:

specifying a position of a viewpoint against the game image based on the progress of the video game;

displaying a game image on the display screen based on the position of the viewpoint specified and game image information stored in a game image information memory, the game image information memory storing the game image information corresponding to a two-dimensional image which includes positional information of the target object in a game image used in the video game, the game image including the two-dimensional image;

receiving a movement request of the viewpoint from the player;

determining whether the target object included in two-dimensional image becomes a display or non-display state in response to the movement request of the viewpoint received in the receiving a movement request of the viewpoint; and receiving selection of the target object by the player when it is determined that the target object does not become the non-display state when determining whether the target object becomes a non-display state, wherein the game image information includes game layer image information indicating layer images respectively drawn on a plurality of layers, wherein the video game processing apparatus further comprises:

a display range determiner configured to determine a display range of each of the layer images respectively drawn on the plurality of layers indicated by the game layer image information included in the game image information stored in the game image information memory, wherein the game image display controller causes the display section to display the game image in which the display ranges of the respective layer images of the plurality of layers determined by the display range determiner are superimposed in a hierarchical order defined in advance, wherein the viewpoint position specifier includes a layer movement amount specifier configured to specify a movement amount of the layer image of each of the plurality of layers in response to the movement request of the viewpoint received by the viewpoint movement request receiver so as to be differentiated for every hierarchy, the layer images of the plurality of layers constituting the game image, wherein the display range determiner re-determines the display range of the layer image of each of the plurality of layers by causing the layer image of each of the plurality of layers to move in accordance with the specified movement amounts of the respective layer images when the layer movement amount specifier specifies the movement amount of each of the layer images, and wherein the display determiner determines whether the target object becomes a display or non-display state based on the display ranges re-determiner by the display range determiner.

\* \* \* \* \*